US008627098B1

(12) United States Patent
Huang

(10) Patent No.: US 8,627,098 B1
(45) Date of Patent: Jan. 7, 2014

(54) ELECTRONIC DEVICE AND METHOD FOR VERIFYING FIRMWARE OF THE ELECTRONIC DEVICE

(71) Applicant: Hon Rai Precision Industry Co., Ltd., New Taipei (TW)

(72) Inventor: Yu-Chen Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/721,080

(22) Filed: Dec. 20, 2012

(30) Foreign Application Priority Data

Jun. 18, 2012 (TW) .............................. 101121700 A

(51) Int. Cl.
*G06F 21/64* (2013.01)
(52) U.S. Cl.
USPC ................... 713/187; 713/2; 726/2; 714/38.1
(58) Field of Classification Search
USPC ......................................................... 713/187
See application file for complete search history.

(56) References Cited

U.S. PATENT DOCUMENTS

| | | | |
|---|---|---|---|
| 2010/0306357 A1* | 12/2010 | Chen | 709/223 |
| 2011/0179407 A1* | 7/2011 | Minegishi | 717/170 |
| 2012/0278653 A1* | 11/2012 | Cheng et al. | 714/13 |
| 2013/0007428 A1* | 1/2013 | Khosrowpour et al. | 713/1 |
| 2013/0080754 A1* | 3/2013 | Ganesh et al. | 713/2 |
| 2013/0185564 A1* | 7/2013 | Jaber et al. | 713/176 |

OTHER PUBLICATIONS

Wang et al., "Firmware-assisted Memory Acquisition and Analysis tools for Digial Forensics", 2011, IEEE, pp. 1-5.*
Ming-tao et al., "Design of Automated Test System of Blade Server," 2012 Editorial Office of Automation and Instrementation, vol. 27, No. 4; pp. 43-46.*
Lin et al., "Using TPM to Improve Boot Security at BIOS layer," 2012, IEEE, pp. 376-377.*
Padmaraj et al. "Targeted Random Test Generation of Power-Aware Multicore Designs", Jun. 2012, ACM, vol. 17 Issue 3, 1-19.*

* cited by examiner

*Primary Examiner* — Luu Pham
*Assistant Examiner* — Demaris Brown
(74) *Attorney, Agent, or Firm* — Altis Law Group, Inc.

(57) ABSTRACT

In a method for verifying firmware of an electronic device, the electronic device includes a baseboard management controller (BMC) for storing a BMC firmware, and a basic input-output system (BIOS) for storing a BIOS firmware. The method writes a first verification code into the BMC firmware, and writes a second verification code into the BIOS firmware. The method writes the BMC firmware into the BMC, and writes the BIOS firmware into the BIOS. The method further triggers the electronic device to power off if the first verification code of the BMC firmware is not identical to the second verification code of the BIOS firmware, and boots an operating system of the electronic device if the first verification code of the BMC firmware is identical to the second verification code of the BIOS firmware.

12 Claims, 3 Drawing Sheets

ELECTRONIC DEVICE AND METHOD FOR VERIFYING FIRMWARE OF THE ELECTRONIC DEVICE

BACKGROUND

1. Technical Field

Embodiments of the present disclosure relate to electronic devices and methods for protecting data of the electronic device, and more particularly to an electronic device and a method for verifying firmware of the electronic device.

2. Description of Related Art

An electronic device usually uses an anti-virus software to protect against computer viruses only after booting an operating system of the electronic device. However, before the operating system of the electronic device is booted, a vicious user or a hacker may run a non-authorized baseboard management controller (BMC) firmware or a non-authorized basic input-output system (BIOS) firmware on the electronic device, which may make data of the electronic device to be exposed to a high level of risk.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some examples of the non-transitory computer-readable storage medium include CDs, DVDs, BLU-RAY, flash memory, and hard disk drives.

Figure 1:
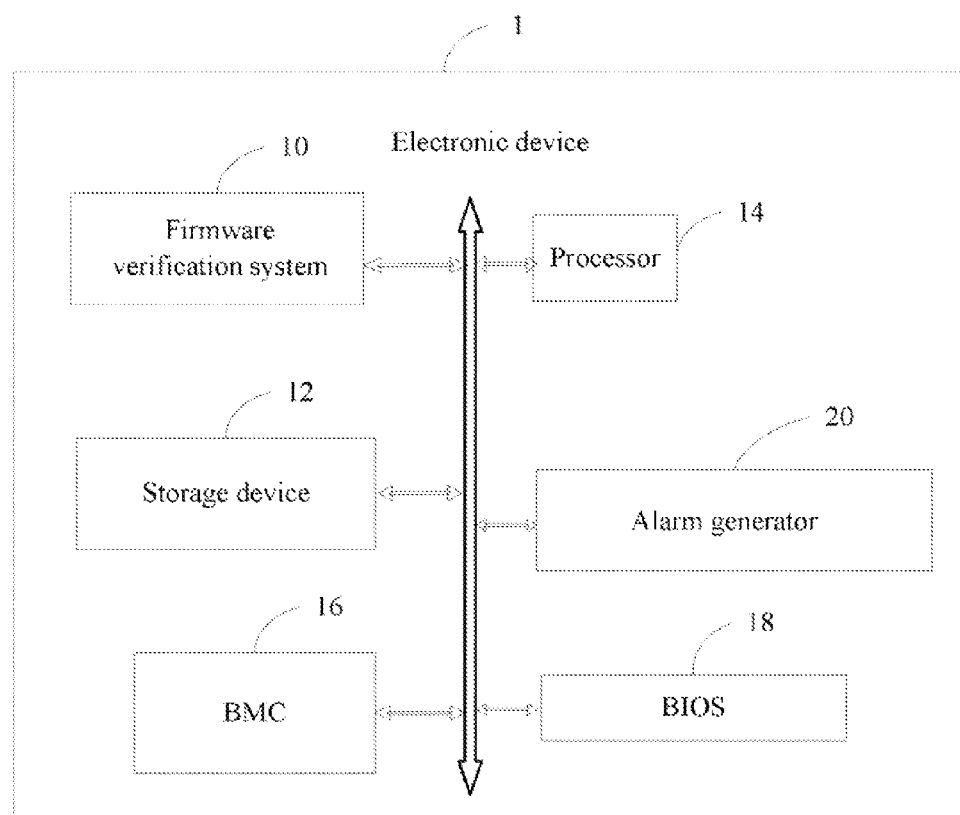
FIG. 1 is a block diagram of one embodiment of an electronic device including a firmware verification system.

FIG. 1 is a block diagram of one embodiment of an electronic device 1 including a firmware verification system 10. In the embodiment, the electronic device 1 further includes, but is not limited, a storage device 12, at least one processor 14, a baseboard management controller (BMC) 16, a basic input-output system (BIOS) 18, and an alarm generator 20. FIG. 1 is only one example of the electronic device 1, other examples may include more or fewer components than those shown in the embodiment, or have a different configuration of the various components.

The storage device 12 may include any type(s) of non-transitory computer-readable storage medium, such as a hard disk drive, a compact disc, a digital video disc, or a tape drive. In the embodiment, the storage device 12 stores computerized codes of the firmware verification system 10.

The at least one processor 14 may include a processor unit, a microprocessor, an application-specific integrated circuit, and a field programmable gate array, for example.

The BMC 16 stores a BMC firmware including a first verification code, and the BIOS 18 stores a BIOS firmware including a second verification code. In the embodiment, the first verification code may be a binary code of a version number of the BMC 16, for example, the version number of the BMC firmware is "1" that can be converted into a binary code of "0001". The second verification code may be predefined the same as the first verification code for verifying firmware of the electronic device 1.

The alarm generator 20 generates an alarm message when the first verification code of the BMC firmware is identical to the second verification code of the BIOS firmware. In the embodiment, the alarm message may be an audio message or a message to prompt the user that the electronic device 1 may be attacked by a vicious user or a hacker.

In one embodiment, the firmware verification system 10 includes a plurality of function modules (see FIG. 2 below), which include computerized codes or instructions that can be stored in the storage device 12 and executed by the at least one processor 14 to provide a method for verifying a firmware of the electronic device 1.

Figure 2:
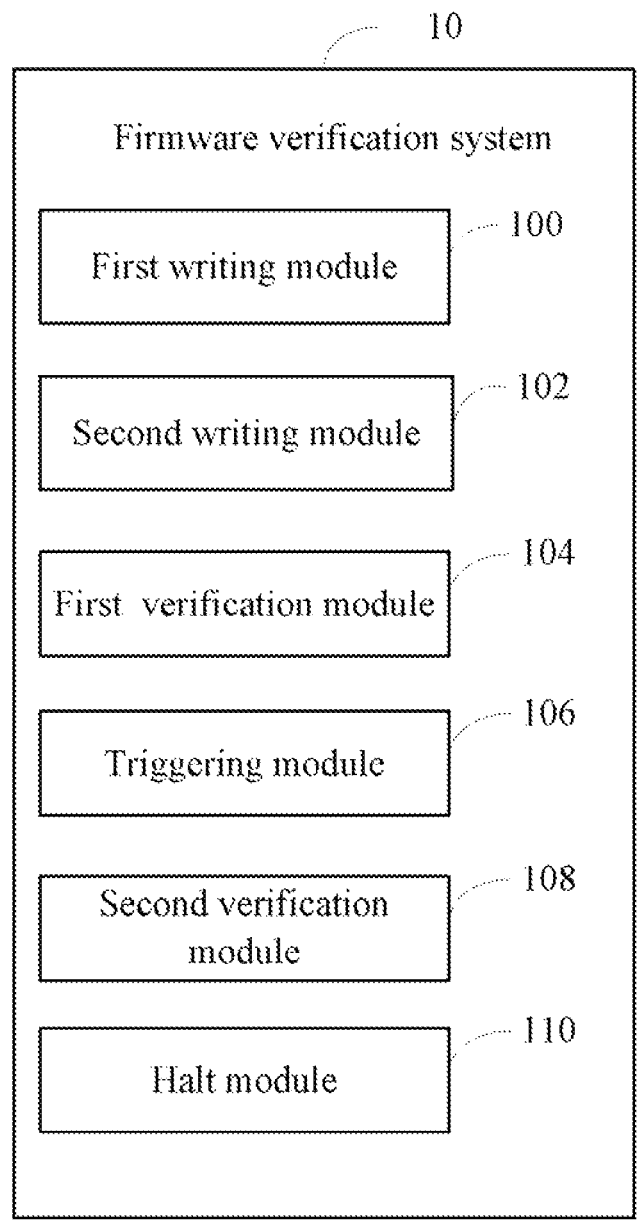
FIG. 2 is a block diagram of one embodiment of function modules of the firmware verification system in FIG. 1.

FIG. 2 is a block diagram of one embodiment of the firmware verifying system 10 included in the electronic device 1. In one embodiment, the firmware verifying system 10 may include a first writing module 100, a second writing module 102, a first verification module 104, a triggering module 106, a second verification module 108, and a halt module 110. The modules may comprise computerized codes in the form of one or more programs that are stored in the storage device 12 and executed by the at least one processor 14 to provide functions for implementing the modules. The functions of the function modules 100-110 are illustrated in FIG. 3 and described below.

Figure 3:
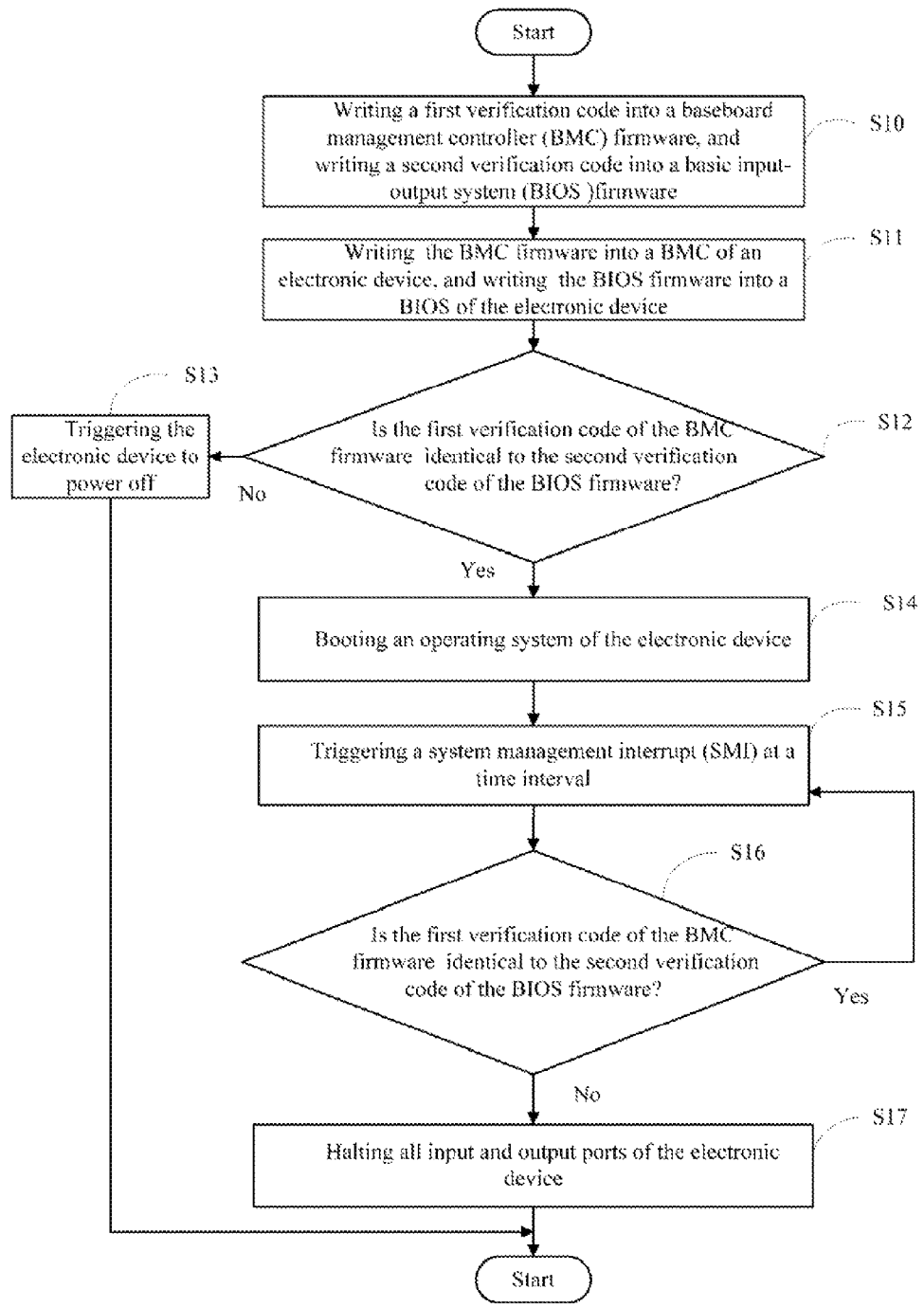
FIG. 3 is a flowchart of one embodiment of a method for verifying firmware of an electronic device.

FIG. 3 illustrates a flowchart of one embodiment of a method for verifying firmware of the electronic device 1. Depending on the embodiment, additional steps may be added, others removed, and the ordering of the steps may be changed.

In step S10, the first writing module 100 writes a first verification code into a BMC firmware, and writes a second verification code into a BIOS firmware. In the embodiment, the verification code may be a binary code of a version number of the BMC 16, for example, the version number of the BMC firmware is "1" which is converted to a binary code of "0001". The second verification code may be predefined the same as the first verification code when the second verification code is written into the BIOS firmware.

In step S11, the second writing module 102 writes the BMC firmware into the BMC 16, and writes the BIOS firmware into the BIOS 18 of the electronic device 1.

In step S12, the first verification module 104 verifies whether the first verification code of the BMC firmware is identical to the second verification code of the BIOS firmware when the electronic device 1 starts a power-on self-test. In the embodiment, the first verification module 104 determines that the BMC firmware or the BIOS firmware may have been substituted by a non-authorized BMC firmware or a non-authorized BIOS firmware if the first verification code is not identical to the second verification code. The first verification module 104 determines that the BMC firmware or the BIOS firmware is not substituted by the non-authorized BMC firmware or the non-authorized BIOS firmware if the first verification code is identical to the second verification code.

In step S13, the triggering module 106 triggers the electronic device 1 to power off if the first verification code of the BMC firmware is not identical to the second verification code of the BIOS firmware.

In step S14, the triggering module 106 boots an operating system (e.g., a WINDOWS OS) of the electronic device 1 if the first verification code of the BMC firmware is identical to the second verification code of the BIOS firmware.

In step S15, the triggering module 106 triggers a system management interrupt (SMI) at a time interval after the operating system of the electronic device 1 is booted. In the embodiment, the time interval may be predefined as a time period according to user requirements, such as 30 minutes.

In step S16, the second verification module 108 verifies whether the first verification code of the BMC firmware is identical to the second verification code of the BIOS firmware when the SMI of the electronic device 1 is triggered. The step S16 is to protect the electronic device 1 against hackers who may run the non-authorized BMC firmware or the non-authorized BIOS firmware on the electronic device 1 after the booting of the operating system of the electronic device 1.

In step S17, the halt module 110 halts all input and output ports of the electronic device 1 to protect data of the electronic device 1 and triggers the alarm generator 20 to generate an alarm message, if the verification code of the BMC firmware is not identical to the second verification code of the BIOS firmware. In the embodiment, the alarm message may be au audio message or a message for prompting the user that the electronic device 1 may be attacked by a vicious user or a hacker.

As described above, from the step S10 to the step S17, the data of the electronic device 1 can be protected against a non-authorized BMC firmware or a non-authorized BIOS firmware by verifying the BMC firmware stored in the BMC 16 and the BIOS firmware stored in the BIOS 18 of the electronic device 1.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a baseboard management controller (BMC) storing BMC firmware;
   a basic input-output system (BIOS) storing BIOS firmware;
   a storage device, and at least one processor; and
   one or more modules that are stored in the storage device and executed by the at least one processor, the one or more modules comprising:
   a first writing module that writes a first verification code into the BMC firmware, and writes a second verification code into the BIOS firmware;
   a second writing module that writes the BMC firmware into the BMC, and writes the BIOS firmware into the BIOS;
   a first verification module verifies whether the first verification code of the BMC firmware is identical to the second verification code of the BIOS firmware when the electronic device starts a power-on self-test;
   a triggering module that triggers the electronic device to power off if the first verification code of the BMC firmware is not identical to the second verification code of the BIOS firmware, and boots an operating system of the electronic device if the first verification code of the BMC firmware is identical to the second BIOS code of the BIOS firmware;
   wherein a second verification module that verifies whether the first verification code of the BMC firmware is identical to the second verification code of the BIOS firmware when the SMI of the electronic device is triggered; and
   wherein a halt module that halts all input and output ports of the electronic device to protect data of the electronic device and triggers an alarm generator of the electronic device to generate an alarm message, if the first verification code of the BMC firmware is not identical to the second verification code of the BIOS firmware.

2. The electronic device according to claim 1, wherein the triggering module further triggers a system management interrupt (SMI) at a time interval after the operating system of the electronic device is booted.

3. The electronic device according to claim 1, wherein the first verification code is a binary code of a version number of the BMC firmware.

4. The electronic device according to claim 3, wherein the second verification code is predefined the same as the first verification code when the second verification code is written into the BIOS firmware.

5. A method for verifying firmware of an electronic device, the method comprising:
   writing a first verification code into a baseboard management controller (BMC) firmware, and writing a second verification code into a basic input-output system (BIOS) firmware;
   writing the BMC firmware into a BMC of the electronic device, and writing the BIOS firmware into a BIOS of the electronic device;
   verifying whether the first verification code of the BMC firmware is identical to the second verification code of the BIOS firmware when the electronic device starts a power-on self-test;
   triggering the electronic device to power off if the first verification code of the BMC firmware is not identical to the second verification code of the BIOS firmware;
   booting an operating system of the electronic device if the first verification code of the BMC firmware is identical to the second BIOS code of the BIOS firmware;
   wherein verifying whether the first verification code of the BMC firmware is identical to the second verification code of the BIOS firmware when the SMI of the electronic device is triggered; and
   wherein halting all input and output ports of the electronic device to protect data of the electronic device and triggering an alarm generator of the electronic device to generate an alarm message, if the first verification code of the BMC firmware is not identical to the second verification code of the BIOS firmware.

6. The method according to claim 5, further comprising:
   triggering a system management interrupt (SMI) at a time interval after the operating system of the electronic device is booted.

7. The method according to claim 5, wherein the first verification code is a binary code of a version number of the BMC firmware.

8. The method according to claim 7, wherein the second verification code is predefined the same as the first verification code when the second verification code is written into the BIOS firmware.

9. A non-transitory computer-readable storage medium having stored thereon instructions, when executed by a processor of an electronic device, causes the processor to perform a method for verifying firmware of the electronic device, the method comprising:
   writing a first verification code into a baseboard management controller (BMC) firmware, and writing a second verification code into a basic input-output system (BIOS) firmware;
   writing the BMC firmware into a BMC of the electronic device, and writing the BIOS firmware into a BIOS of the electronic device;

verifying whether the first verification code of the BMC firmware is identical to the second verification code of the BIOS firmware when the electronic device starts a power-on self-test;

triggering the electronic device to power off if the first verification code of the BMC firmware is not identical to the second verification code of the BIOS firmware;

booting an operating system of the electronic device if the first verification code of the BMC firmware is identical to the second BIOS code of the BIOS firmware;

wherein verifying whether the first verification code of the BMC firmware is identical to the second verification code of the BIOS firmware when the SMI of the electronic device is triggered; and wherein halting all input and output ports of the electronic device to protect data of the electronic device and triggering an alarm generator of the electronic device to generate an alarm message, if the first verification code of the BMC firmware is not identical to the second verification code of the BIOS firmware.

10. The storage medium according to claim 9, wherein the method further comprises:

triggering a system management interrupt (SMI) at a time interval after the operating system of the electronic device is booted.

11. The storage medium according to claim 9, wherein the first verification code is a binary code of a version number of the BMC firmware.

12. The storage medium according to claim 11, wherein the second verification code is predefined the same as the first verification code when the second verification code is written into the BIOS firmware.

* * * * *